Feb. 7, 1956 A. D. BEARD 2,734,134

SIGNAL RESPONSIVE CIRCUIT

Filed Nov. 29, 1952

INVENTOR.

ARTHUR D. BEARD

BY Morris A. Rabkin

ATTORNEY 2,734,134
Patented Feb. 7, 1956

2,734,134

SIGNAL RESPONSIVE CIRCUIT

Arthur D. Beard, Haddonfield, N. J., assignor to Radio Corporation of America, a corporation of Delaware Application November 29, 1952, Serial No. 323,320

The terminal 15 years of the term of the patent to be granted has been disclaimed 12 Claims. (Cl. 250—27)

This invention relates to information handling devices and computers; and particularly to an electronic signal responsive circuit having utility therein. Gating and buffer circuits used in the digital computer art have been given a nomenclature which relates to the logical function performed by the circuit. A gate is sometimes called a coincidence or logical "and" circuit. Such a circuit usually has a first and second input, and an output. An output is derived only if the first and second inputs are simultaneously applied. A buffer is called a logical "or" circuit, since an output is produced if signals are applied to either one or the other of two inputs. Circuits of this general type are described in "High-Speed Computing Devices" by Engineering Research Associates, McGraw-Hill, 1950, chapter 4. One form of logical circuit is that in which the function "either but not both" is produced; that is to say, an output is produced if a signal is applied to either one or the other of two inputs but not if a signal is applied to both inputs simultaneously. This is sometimes called an anti-coincidence circuit. This type of circuit is of general utility in the digital computer art as a switching circuit. It may also be used to determine if two bits or binary digits of binary information are represented by an odd or even number of pulses; and a plurality of such circuits may be combined to perform a parity check. The utilization of an "either but not both" circuit for a parity check is described in U. S. Patent No. 2,596,199. A further use of this type of logical circuit is in a binary adder as described in "High-Speed Computing Devices," cited above, chapter 13. Some of the prior art circuits that perform the logic of "either but not both" have the disadvantage of being uneconomical because of a relatively large number of circuit components being required. In others, the utility and reliability of the circuit is limited by complexity of circuit design.

Accordingly, it is an object of this invention to provide a new and improved signal responsive circuit of the type producing an output signal when a signal is present at either of two inputs but not present at both simultaneously.

Another object of this invention is to provide a simple signal responsive circuit which is economical and reliable.

Still another object of this invention is to provide a simple electronic circuit having two inputs, that translates signals received by either input and that neutralizes signals received simultaneously by both inputs.

These and other objects of this invention are achieved in a circuit utilizing an electron tube of the pentode gating type. The characteristics of this tube are such that no screen current is drawn when the first and second control grids are both negatively biased to cutoff potential; screen current of intermediate magnitude is drawn when the voltages at both control grids are above cutoff potential; and screen current of higher magnitude is drawn when the voltage at the first control grid is above cutoff potential and that at the second control grid is at cutoff potential. In the latter case, the higher magnitude screen current results from the fact that the plate current is switched to the screen when the second control grid is made sufficiently negative. Under such conditions, the screen current is increased by an amount approximately equal to the repelled plate current.

A circuit embodying this invention is based on the aforementioned characteristics of a tube of this type. The first and second control grids are respectively connected to A and B input terminals, and they are both biased to cutoff potential. A positive potential is applied to the screen grid through a screen dropping resistor. The cathode of a voltage discriminating diode is connected to the screen grid, and a reference potential is applied to the diode anode through a load resistor. Output voltages are taken from the diode anode. The reference potential is approximately equal to the screen grid voltage corresponding to intermediate screen current. When positive A and B input voltage pulses are simultaneously applied to both control grids, screen current is of intermediate magnitude; and when there is an absence of a pulse at both the A and B inputs, screen current is zero. In either case, the screen grid voltage is not less than the reference potential applied to the diode anode. Therefore, the diode does not conduct, and the output voltage is the same as the reference potential. However, when a positive pulse is applied to the A input and there is the absence of a pulse at the B input, the screen current is larger than the intermediate magnitude, and the screen grid voltage is less than the reference potential. Therefore, the discriminating diode conducts, and a negative-going output pulse is produced at the diode anode. The logic carried out by such a circuit is called "but-not"; i. e. there is an output pulse if there is an A input pulse, but not if there is a B input pulse applied simultaneously.

The function of "either but not both" is provided by a circuit utilizing a pair of tubes of the type mentioned. The A input is simultaneously applied to the first control grid of a first one of the tubes and to the second control grid of the second tube. The B input is simultaneously applied to the second and first control grids of the first and second tubes, respectively. A voltage discriminating diode is connected to each screen grid, and also connected to a single output terminal. The voltage discriminator arrangement produces an output pulse when either an A or a B input pulse is received, since the first or second screen grid is at a high voltage level. But if A and B pulses are applied simultaneously, both screen grids are at relatively low, intermediate voltage levels, and there is no output pulse.

A binary adder circuit is formed with two "either but not both" circuits. The output of the first circuit is connected as one of the inputs of the second. The previous "carry" is applied to the second input of the second circuit. The output of the second circuit is the "sum" output. A common anode impedance is provided for one of the first circuit tubes and one of the second circuit tubes. A common "carry" output is taken from the anodes of these tubes.

The novel features of this invention, both as to its organization and method of operation, may be best understood from the following description when read together with the accompanying drawings in which Figure 1 is a schematic circuit diagram of an embodiment of this invention;

Figures 1, 3:
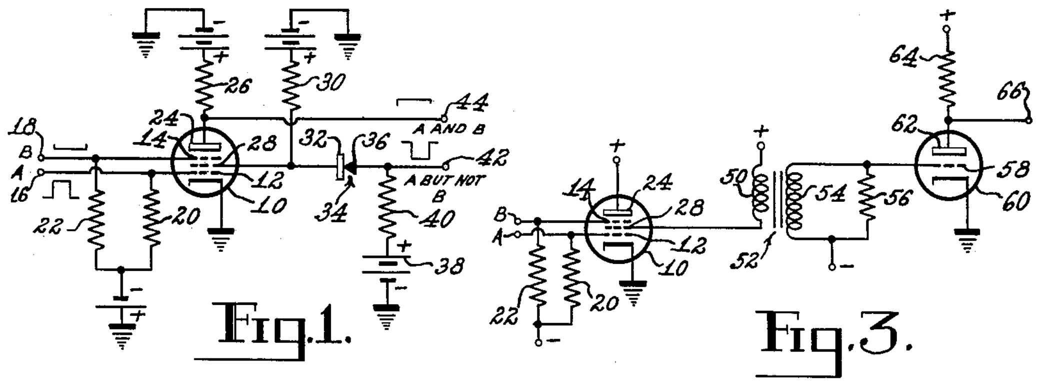
Figure 3 is a circuit diagram of another embodiment of this invention.

Referring now to Figure 1, a circuit is shown employing an electron discharge tube 10 of the pentode type. The first and second control grids 12, 14 of the tube 10 are connected respectively to A and B input terminals 16, 18. A negative biasing potential is applied to both control grids 12, 14 through separate grid resistors 20, 22. A positive operating potential is applied to the anode 24 of the tube 10 through a load resistor 26. A positive operating potential is applied to the screen grid 28 through a dropping resistor 30. The cathode 32 of a crystal diode 34 is connected to the screen grid 28, and the anode 36 of the diode 34 is connected to the positive side of a source of reference potential 38 through a load resistor 40. A first output terminal 42 is connected to the anode 36 of the diode 34, and a second output terminal 44 is connected to the anode 24 of the pentode 10.

Figure 2:
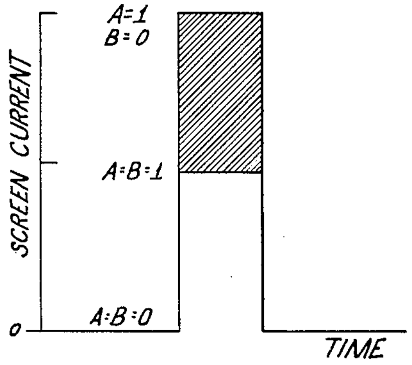
Figure 2 is a graphical diagram illustrating a principle employed in this invention.

The pentode tube 10 is normally operated with both control grids 12, 14 at cutoff potential. Therefore, normally there is neither anode nor screen grid current being drawn. When both control grids 12, 14 are above cutoff potential, both anode and screen current is drawn. When the voltage at the first control grid 12 is above cutoff potential and that at the second control grid 14 is at cutoff potential, screen grid current is drawn, but the anode current is repelled by the negative suppressor acting as a second control grid 14. In this case, the screen current is increased by an amount approximately equal to the repelled plate current. These characteristics are shown graphically in Figure 2. In the absence of input pulses (represented in the drawing by "0"), the screen current is zero. When both input terminals 16, 18 receive positive pulses (represented in the drawing by "1"), there is screen current flowing of "normal" or intermediate magnitude. However, when only the A terminal 16 receives a positive pulse, the screen current is increased significantly to a higher magnitude, as shown by the hatched area in Figure 2.

The above described characteristics of the pentode tube may be used for switching purposes by discriminating between screen current of intermediate magnitude or less, and screen current of higher magnitude occurring when only the first control grid is pulsed positively. A voltage threshold device or discriminating arrangement is used to discriminate between the screen grid voltage threshold corresponding to intermediate current or less, and the screen grid voltage corresponding to higher magnitude screen current. When the potential at the cathode 32 of the diode 34 is equal to or greater than that of the reference potential source 38 applied to the anode 36, the diode 34 does not conduct. The reference potential at the diode anode 36 is chosen to be equal to or less than that of the voltage at the screen grid 28 corresponding to an intermediate current. Thus, when both control grids 12, 14 of the pentode are pulsed, there is no current flow through the diode 34, and the first output terminal 42 is at the same potential as the source 38 applied to the diode anode 36. However, when only the first control grid 12 is pulsed positively, a higher magnitude screen grid current flows, which results in a lower voltage at the screen grid 28 as well as at the diode cathode 32, and current is drawn through the diode load resistor 40. This results in a negative-going pulse at the first output terminal 42. In the absence of input pulses, the screen voltage is high. No current flows through discriminating diode, and there is no output pulse. In this manner, the logic of A but not B is provided. An output pulse is produced at the first output terminal if there is an A input pulse, but not if there is a B input pulse received simultaneously.

An output may also be taken at the anode of the pentode in the usual manner to provide the logic of A and B. That is, if both A and B input pulses are received simultaneously, plate current is drawn, and a negative-going pulse is produced at the second output terminal 44.

The circuit has been described thus far, as operating with voltage pulses. However, it should be noted that the circuit is direct coupled throughout, and therefore, operates equally well with static potential levels applied to the inputs. The same logic is provided so that there is a low voltage output when the A input is at high voltage, but not if the B input is also high.

An alternative arrangement or threshold device for discriminating between intermediate and higher screen grid currents is shown in Figure 3. A positive operating potential is applied to the screen grid 28 of the pentode 10 through the primary coil 50 of a transformer 52. The secondary 54 of the transformer has a resistor 56 connected across it. One end of the resistor 56 is connected to a negative biasing potential. The other end of the resistor 56 is connected to the control grid 58 of an electron tube 60. A positive operating potential is applied to the anode 62 of this output tube 60 through a load resistor 64, and an output terminal 66 is connected to the anode 62. The output tube 60 is normally biased to cutoff through the transformer resistor 56. The magnitude of the negative biasing potential is chosen to be greater than the voltage drop across the resistor 56 due to a secondary current induced by an intermediate magnitude screen grid current in the transformer primary 50. Therefore, when screen grid current of intermediate magnitude flows in the transformer primary 50, the current in the secondary 54 is not sufficient to produce a voltage drop across the transformer resistor 56 such as to overcome the negative bias potential and cause the output tube 60 to conduct. However, when the screen grid current is of high magnitude, the voltage drop across the transformer resistor 56 due to the secondary current is sufficiently large to overcome the bias potential and the output tube 60 conducts, producing a negative-going pulse at the output terminal.

Figure 4:
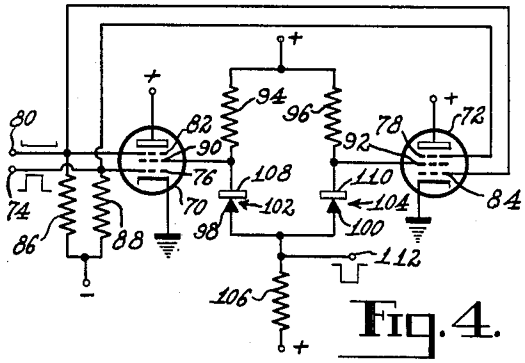
Figure 4 is a circuit diagram of an "either but not both" circuit embodying the principles of this invention.

The function of "either but not both" is produced by the circuit embodying this invention shown in Figure 4. A first and a second pentode 70, 72 are used. An A input terminal 74 is connected to the first control grid 76 of the first tube 70 and to the second control grid 78 of the second tube 72. The B input terminal 80 is connected to the first tube second control grid 82 and to the second tube first control grid 84. A negative biasing potential is applied to the control grids through separate grid resistors 86, 88. Positive operating potential is applied to both screen grids 90, 92 through separate dropping resistors 94, 96. A positive reference potential is applied to the anodes 98, 100 of separate discriminating diodes 102, 104 through a common load resistor 106. The cathode 108, 110 of each diode 102, 104 is connected to a different one of the screen grids 90, 92. An output terminal 112 is connected to the diode anodes 98, 100.

Both tubes 70, 72 are normally cutoff, and the level of reference potential is chosen to be equal to or lower than the screen grid voltage for intermediate screen current in the manner described above. When positive input pulses are applied simultaneously to both input terminals 74, 80, the voltages at both screen grids 90, 92 are equal to or greater than the voltage at the diode anodes 98, 100. Thus, the diodes 102, 104 do not conduct, and there is no change in potential at the output terminal 112. However, if a positive pulse is applied to only the A input terminal 74, a high magnitude screen current flows in the first tube 70. Thus, the potential at the first tube screen grid 90 falls below that of the reference potential, and the diode 102 connected thereto conducts, which produces a negative-going pulse at the output terminal 112. Similarly, when a positive pulse is applied to the B input terminal 80, a large screen current flows in the second tube 72, and an output pulse is produced. Since the potential at the output terminal 112 charges only when one or the other of the input terminals receives a pulse, but not when both terminals receive pulses, the logic of "either but not both" is provided.

It should be noted that the "either but not both" circuit described above is direct coupled throughout so that it operates equally well with static potential levels as inputs as it does with pulses.

Figure 5:
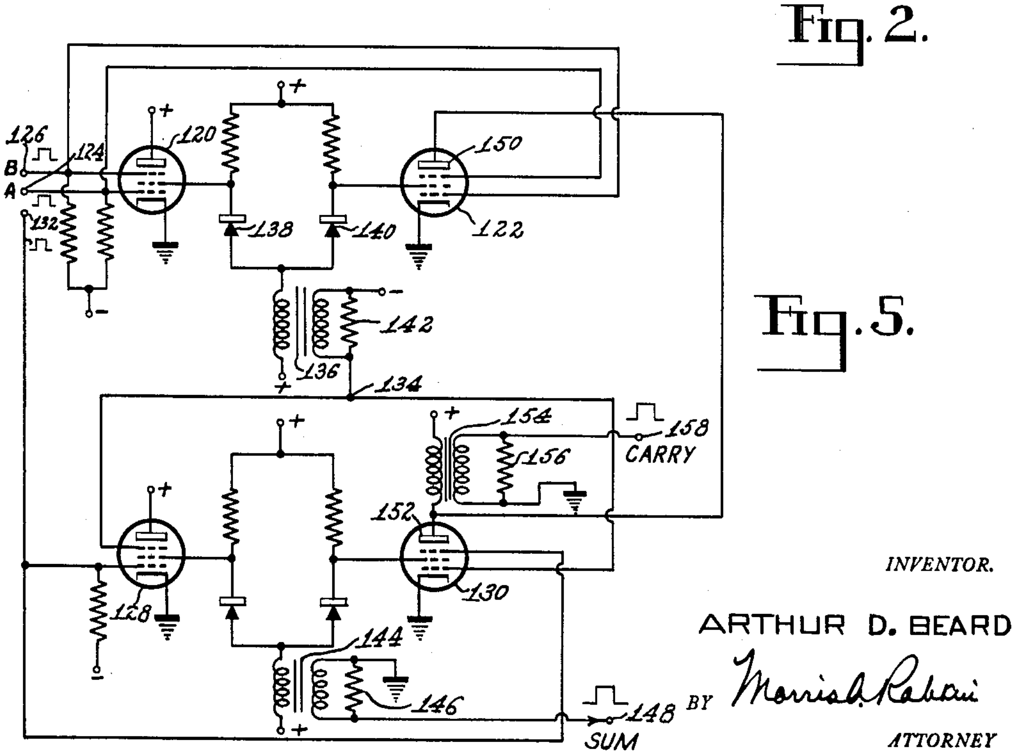
Figure 5 is a circuit diagram of a binary adder embodying the principles of this invention.

A binary adder is shown in Figure 5 which is made up of two "either but not both" circuits. The first circuit is made up of a first and second pentode 120, 122 connected to A and B input terminals 124, 126 in the manner described above. These inputs are used to receive the addend and augend to be added. The second circuit is made up of a third and fourth pentode 128, 130 which have their control grids connected to third and fourth input terminals 132, 134 in the manner described above. The third input terminal 132 receives the "carry" from the previous column. The fourth input terminal 134 receives the output from the first circuit. The output of the first circuit is produced by the primary of a transformer 136 connected to the anodes of the discriminating diodes 138, 140. A load resistor 142 is connected across the secondary of the transformer 136 and has a negative biasing or reference potential applied to one end. The other end of the load resistor 142 is connected to the input terminal 134 of the second circuit. The output from the second circuit is provided by a transformer 144 and a resistor 146 connected to ground, as in the first circuit, and applied to a first output terminal 148. The anodes 150, 152 of the second and fourth tubes 122, 130 are connected together to a source of positive operating potential through the primary of a transformer 154. The secondary of the transformer 154 has a load resistor 156 connected across it, one end of which is connected to ground and the other is connected to a second output terminal 158.

If either the A or B input is the binary digit "1" as represented by a positive pulse, then the first circuit produces an output pulse which is inverted by the transformer, and applied as a positive pulse to the fourth input terminal 134 of the second circuit. If, in addition, there is no previous carry pulse applied to the C input 132, then there is high screen current and no plate current in the fourth tube 130 and neither screen nor plate current in the third tube 128. Thus, there is an output pulse at the first output terminal 148 indicating the sum of "1." Another situation is where there is a previous carry pulse applied to the third input terminal 132 in addition to an output pulse from the first circuit, then plate current is drawn in both the third and fourth tubes 128, 130 so that the screen current in those tubes is only of intermediate magnitude. Thus, there is no output pulse at the first output terminal 148 indicating a sum of "0." However, since plate current was drawn through the fourth tube 130, a pulse is produced at the second output terminal 158 which indicates a carry of "1" to the next column in the addition. In a similar manner, if both A and B are "1" so that positive pulses are applied to both the first and second input terminals 124, 126, a pulse is not applied to the fourth input terminal 134. However, since plate current is drawn in the second tube 122, there is a carry pulse produced at the second output terminal 158. If, in addition, there is a pulse at the third input terminal for previous carry, a large screen current is drawn in the third tube 128 and a positive pulse is produced at the first output terminal 148. Thus, under the condition of positive pulses being applied to all three input terminals simultaneously, there is a positive output pulse at the sum terminal 148 and also a positive pulse at the carry output terminal 158.

Thus, there is shown a complete binary adder which consists of only four tubes and four crystal diodes. It presents no loading problems or excessive voltage requirements at its inputs. It also provides an output pulse of sufficient amplitude to directly drive other electronic circuits. This output pulse may be of either positive or negative polarity where desired by appropriate arrangement of the output transformers.

It is evident from the above description that a circuit embodying this invention produce the logical functions of "but not," "either but not both," and provide a binary adder. These circuits are simple and reliable in operation, are economical and find widespread utility.

What is claimed is:

1. A signal responsive circuit utilizing an electron discharge tube having anode, cathode, screen grid and first and second control electrodes, wherein said screen grid electrode draws substantially zero current with a tube-cutoff voltage applied to said first control electrode, current of intermediate magnitude with a tube-conductive voltage applied to both of said control electrodes, and current of high magnitude with a tube-conductive voltage applied to said first control electrode and a tube-cutoff voltage applied to said second control electrode, said circuit comprising said electron discharge tube, a first and second input terminal respectively connected to said first and second control electrodes, current discriminating means responsive to a current of magnitude greater than said intermediate magnitude and of magnitude equal to or less than said intermediate magnitude for respectively producing a signal of one type and another type, an output terminal, and means for coupling said current discriminating means between said screen grid electrode and said output terminal, said current discriminating means including a resistor connected to said screen grid electrode, means for applying a screen grid operating potential to said resistor whereby the voltage at said screen grid electrode varies with said screen grid current, and voltage discriminating means responsive to a voltage less than and to a voltage at least equal to the screen grid voltage corresponding to said intermediate screen grid current for respectively producing a voltage signal of one type and another type at said output terminal.

2. A signal responsive circuit utilizing an electron discharge tube having anode, cathode, screen grid and first and second control electrodes, wherein said screen grid electrodes draw substantially zero current with a tube-cutoff voltage applied to said first control electrode, current of intermediate magnitude with a tube-conductive voltage applied to both of said control electrodes, and current of high magnitude with a tube-conductive voltage applied to said first control electrode and a tube-cutoff voltage applied to said second control, said circuit comprising said electron discharge tube, a first and second input terminal respectively connected to said first and second control electrodes, current discriminating means responsive to a current of magnitude greater than said intermediate magnitude and of magnitude equal to or less than said intermediate magnitude for respectively producing a signal of one type and another type, an output terminal, and means for coupling said current discriminating means between said screen grid electrode and said output terminal, said current discriminating means including a transformer, the primary thereof being coupled to said screen grid electrode, and voltage discriminating means coupled between the secondary of said transformer and said output terminal.

3. A signal responsive circuit utilizing electron discharge tubes having anode, cathode, screen grid and first and second control electrodes, wherein said screen grid electrode draws substantially zero current with a tube-cutoff voltage applied to said first control electrode, current of intermediate magnitude with a tube-conductive voltage applied to both of said control electrodes, and current of high magnitude with a tube-conductive voltage applied to said first control electrode and a tube-cutoff voltage applied to said second control electrode, said circuit comprising a first and a second of said electron discharge tubes, a first input terminal connected to said first tube first control electrode and said second tube second control electrode for simultaneously applying signals thereto, a second input terminal connected to said second tube first control electrode and said first tube second control electrode for simultaneously applying signals thereto, current discriminating means responsive to a current of magnitude greater than said intermediate magnitude and of magnitude equal to or less than said intermediate magnitude for respectively producing a signal of one type and another type, an output terminal, and means for coupling said current discriminating means to said first and second tube screen grid electrodes and to said output terminal.

4. A signal responsive circuit as recited in claim 3 wherein said current discriminating means includes separate resistors connected to different ones of said screen grid electrodes, means for applying a screen grid operating potential to said resistors whereby the voltage at said screen grid electrodes varies with screen grid current, and voltage discriminating means responsive to voltages less than and to voltages at least equal to the screen grid voltage corresponding to said intermediate screen grid current for respectively producing voltage signals of one type and another type at said output terminal.

5. A signal responsive circuit as recited in claim 4 wherein said voltage discriminating means includes a pair of diodes the cathodes thereof being connected to different ones of said screen grid electrodes, a load resistor connected to the anodes of said diodes, means for applying to said load resistor a discriminating potential of magnitude equal to or less than the screen grid voltage corresponding to said intermediate screen grid current, and means coupling the anodes of said diodes to said output terminal.

6. A signal responsive circuit comprising a first and a second electron discharge tube each having anode, cathode, screen, and first and second control electrodes, means for applying operating potentials to said anode and screen grid electrodes, a first input terminal connected to said first tube first control electrode and said second tube second control electrode for simultaneously applying signals thereto, a second input terminal connected to said second tube first control electrode and said first tube first control electrode for simultaneously applying signals thereto, an output terminal, and voltage discriminating means coupled to said screen grid electrodes and responsive to voltages of predetermined magnitude thereat for producing signals at said output terminal.

7. A signal responsive circuit utilizing electron discharge tubes having anode, cathode, screen grid, and first and second control electrodes, wherein said screen grid electrode draws substantially zero current with a tube-cutoff voltage applied to said first control electrode, current of intermediate magnitude with a tube-conductive voltage applied to both of said control electrodes, and current of high magnitude with a tube-conductive voltage applied to said first control electrode and a tube-cutoff voltage applied to said second control electrode, said circuit comprising a first, second, third and fourth of said electron discharge tubes, a first and second input terminal respectively connected to said first and second tube first control electrodes and respectively connected to said second and first tube second control electrodes, a third and fourth input terminal respectively connected to said third and fourth tube first control electrodes and respectively connected to said fourth and third tube second control electrodes, means coupling said first and second tube screen grid electrodes to said fourth input terminal, and an output terminal coupled to said third and fourth tube screen grid electrodes.

8. A signal responsive circuit utilizing electron discharge tubes having anode, cathode, screen grid and first and second control electrodes, wherein said screen grid electrode draws substantially zero current with a tube-cutoff voltage applied to said first control electrode, current of intermediate magnitude with a tube-conductive voltage applied to both of said control electrodes, and current of high magnitude with a tube-conductive voltage applied to said first control electrode and a tube-cutoff voltage applied to said second control electrode, said circuit comprising a first, second, third and fourth of said electron discharge tubes, a first and second input terminal respectively connected to said first and second tube first control electrodes and respectively connected to said second and first tube second control electrodes, a third and fourth input terminal respectively connected to said third and fourth tube first control electrodes and respectively connected to said fourth and third tube second control electrodes, means for applying operating potentials to said anode and said screen grid electrodes, voltage discriminating means coupling said first and second tube screen grid electrodes to said fourth input terminal, a first and second output terminal, voltage discriminating means coupling said third and fourth tube screen grid electrodes to said first output terminal, and means coupling the anode of one of said first and second tubes and the anode of one of said third and fourth tubes to said second output terminal.

9. A signal responsive circuit utilizing an electron discharge tube having anode, cathode, screen grid and first and second control electrodes, wherein said screen grid electrode draws substantially zero current with a tube-cutoff voltage applied to said first control electrode, current of intermediate magnitude with a tube-conductive voltage applied to both of said control electrodes, and current of high magnitude with a tube-conductive voltage applied to said first control electrode and a tube-cutoff voltage applied to said second control electrode, said circuit comprising said electron discharge tube, a first and second input terminal respectively connected to said first and second control electrodes, current discriminating means responsive to a current of magnitude greater than said intermediate magnitude and of magnitude equal to or less than said intermediate magnitude for respectively producing a signal of one type and another type, said current discriminating means including an impedance coupled to said screen grid electrode for providing different voltage levels corresponding to said screen currents, an electron control device coupled to said impedance and responsive to said voltage levels, and means for biasing said control device to a threshold voltage level corresponding to said intermediate magnitude current, and an output terminal coupled to said control device.

10. A signal responsive circuit as recited in claim 9 wherein said electron control device is a diode coupled to said screen grid electrode and to said means for biasing said electron control device.

11. A signal responsive circuit as recited in claim 9 wherein said electron control device is a grid-controlled electron tube having the grid thereof coupled to said screen grid electrode and to said means for biasing said electron control device.

12. A signal response circuit utilizing an electron discharge tube having anode, cathode, screen grid and first and second control electrodes, wherein said screen grid electrode draws substantially zero current with a tube-cutoff voltage applied to said first control electrode, current of intermediate magnitude with a tube-conductive voltage applied to both of said control electrodes, and current of high magnitude with a tube-conductive voltage applied to said first control electrode and a tube-cutoff voltage applied to said second control, said circuit comprising said electron discharge tube, a first and second input terminal respectively connected to said first and second control electrodes, current discriminating means responsive to a current of magnitude greater than said intermediate magnitude and of magnitude equal to or less than said intermediate magnitude for respectively producing a signal of one type and another type, an output terminal, and means for coupling said current discriminating means between said screen grid electrode and said output terminal, said circuit being direct coupled throughout.

References Cited in the file of this patent

UNITED STATES PATENTS

| | | |
|---|---|---|
| 2,534,232 | Cleeton | Dec. 19, 1950 |
| 2,614,169 | Cohen et al. | Oct. 14, 1952 |
| 2,640,965 | Eaglesfield | June 2, 1953 |